United States Patent
Alsewailem et al.

(10) Patent No.: US 8,419,946 B2
(45) Date of Patent: Apr. 16, 2013

(54) METHOD FOR REMOVING HEAVY METALS FROM CONTAMINATED WATER

(75) Inventors: Fares D. Alsewailem, Riyadh (SA); Saad A. Aljlil, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 282 days.

(21) Appl. No.: 12/759,081

(22) Filed: Apr. 13, 2010

(65) Prior Publication Data

US 2011/0247982 A1    Oct. 13, 2011

(51) Int. Cl.
C02F 1/42    (2006.01)
C02F 1/62    (2006.01)

(52) U.S. Cl.
USPC ............ 210/679; 210/688; 210/912

(58) Field of Classification Search ............ 210/679, 210/688, 912, 913
See application file for complete search history.

(56) References Cited

U.S. PATENT DOCUMENTS

| | | | |
|---|---|---|---|
| 3,375,933 A * | 4/1968 | Rodman | 210/502.1 |
| 4,133,755 A | 1/1979 | Tarao et al. | |
| 4,167,481 A * | 9/1979 | Cremers et al. | 210/679 |
| 5,045,210 A | 9/1991 | Chen et al. | |
| 5,256,615 A | 10/1993 | Oomura et al. | |
| 5,667,694 A | 9/1997 | Cody et al. | |
| 7,514,004 B1 * | 4/2009 | Brady et al. | 210/688 |
| 2006/0163151 A1 * | 7/2006 | Kawasaki et al. | 210/502.1 |
| 2008/0302733 A1 * | 12/2008 | Wang et al. | 210/705 |

FOREIGN PATENT DOCUMENTS

WO    00/72958    12/2000

OTHER PUBLICATIONS

Al-Jlil et al., "Saudi Arabian clays for lead removal in wastewater", Applied Clay Science 42, 2009, pp. 671-674, Published Jan. 2009.

* cited by examiner

*Primary Examiner* — Matthew O Savage
(74) *Attorney, Agent, or Firm* — Andrew M. Calderon; Roberts Mlotkowski Safran & Cole, P.C.

(57) ABSTRACT

A method and adsorbent composition for removing heavy metals from contaminated water, comprising passing a stream of water having a concentration of one or more heavy metals through an adsorbent comprising granules of a mixture of from about 1 wt % to about 15 wt % clay and a thermoplastic polymer matrix; and collecting water having a reduced concentration of said heavy metal(s) downstream of said adsorbent.

15 Claims, 1 Drawing Sheet

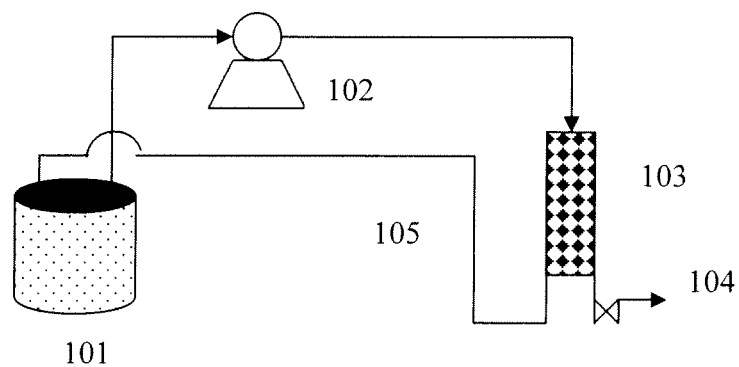

METHOD FOR REMOVING HEAVY METALS FROM CONTAMINATED WATER

FIELD OF THE INVENTION

The invention relates to an adsorbent for removing heavy metals from contaminated water, and more particularly, to a continuous process for decontaminating a heavy metal contaminated stream of water.

BACKGROUND OF THE INVENTION

In the area of water treatment, such as ground water or industrial waste water treatment, there is an ever-increasing need to remove undesirable and even toxic contaminants, particularly heavy metal contaminants, from water. Many industrial processes utilize aqueous solutions of heavy metals, such as lead in manufacture of batteries, and chromium or copper in electroplating solutions.

Unfortunately, the removal of such heavy metals from the aqueous solutions used in these processes has proven to be not only difficult but expensive, especially when conducted in batch processing. In order to reduce the cost and time of decontamination, prior art continuous processes have utilized quite expensive synthetic ion-exchange resins packed in a column, through which the contaminated water is passed for treatment and heavy metal removal. Typically, such synthetic ion-exchange resins require reverse flushing of the packed column to regenerate the resin, whereby a heavy metal-contaminated flushing fluid is produced, making disposal still difficult.

U.S. Pat. No. 4,133,755 to Tarao et al., incorporated by reference herein, discloses agents for removing heavy metals comprising a composition consisting mainly of a dithiocarbamate bond-containing low molecular weight compound, amorphous silica and activated carbon powder, granulated with a vinyl acetate polymer binder and clay as a thixotropic excipient. The patentees disclose packing said granulated materials into columns for treating mercury-contaminated waste water.

U.S. Pat. No. 5,667,694 to Cody et al., incorporated by reference herein, discloses a process for removing dissolved heavy metals including lead and radioactive contaminants from contaminated aqueous systems including aqueous soil systems. An organically modified smectite clay, or organo-clay, is used to treat these systems. Organoclays are the reaction product of smectite clays and quaternary ammonium compounds. The organoclay is brought in contact with system to be treated where it sorbs the heavy metal in the aqueous system onto the organoclay which sorbed complex is then removed by a variety of methods including flotation and air sparging.

U.S. Pat. No. 5,256,615 to Oomura et al., incorporated by reference herein, discloses a granular inorganic ion exchanger which is obtained by firing at 400° C. or higher a granular molded product of a mixture of a metal alkoxide such as $Si(OMe)_4$ or hydrolyzate thereof, a clay mineral such as sepiolite and an inorganic ion exchanger such as antimony pentoxide and which has mechanical strength and heat resistance without losing its inherent ion exchangeability.

U.S. Pat. No. 5,045,210 to Chen et al., incorporated by reference herein, discloses an ion-exchange media comprising a modified polysaccharide material and a modified particulate polymeric material, said modified materials comprising a polysaccharide and particulate polymeric materials covalently bonded to a synthetic polymer, said synthetic polymer comprising a copolymer made from a polymerization of: (a) a polymerizable compound having a chemical group capable of covalently coupling, directly or indirectly, to said materials; and (b) a polymerizable compound containing (i) an ionizable chemical group or (ii) a chemical group capable of transformation to an ionizable chemical group. The media is useful to selectively remove heavy metal contaminants from aqueous solutions containing said contaminants.

World Patent Publication No. WO 00/72958 to Payzant et al., incorporated by reference herein, discloses a networked polymer/clay alloy produced from a monomer/clay mixture comprising a monomer, a cross-linking agent and clay particles. The clay is chemically integrated with the polymer such that, on exposure to water, the networked polymer/clay alloy swells with substantially no clay separating from the alloy.

However, none of the above-discussed references discloses or suggests a relatively inexpensive but highly effective ion-exchange packing for removal of heavy metal contaminants from contaminated water streams. Accordingly, there exists a need in the art to overcome the deficiencies and limitations described hereinabove.

SUMMARY OF THE INVENTION

In a first embodiment, the invention is directed to an adsorbent composition for metal ions, comprising a granulated mixture of from about 1 wt % to about 15 wt % clay and a thermoplastic polymer matrix.

In another embodiment, the invention is directed to a method for removing heavy metals from contaminated water, comprising passing a stream of water having a concentration of one or more heavy metals through an adsorbent composition comprising granules of a mixture of from about 1 wt % to about 15 wt % clay and a thermoplastic polymer matrix; and collecting water having a reduced concentration of said heavy metal(s) downstream of said adsorbent.

BRIEF DESCRIPTION OF THE DRAWINGS

The present invention is described in the detailed description which follows, in reference to the noted plurality of drawings by way of non-limiting examples of exemplary embodiments of the present invention.

FIG. 1 shows a recirculating system for treating heavy metal contaminated water according to the present invention.

DETAILED DESCRIPTION OF THE INVENTION

The invention relates to an adsorbent composition for removing heavy metals from contaminated water, and more particularly, to a continuous process for decontaminating a heavy metal contaminated stream of water.

Naturally occurring clay has been known for use in treating water contaminated with heavy metals, since some such clays have an inherent ion-exchange capacity. For example, clay minerals have been found to be in the form of layered molecular structures, often having variable amounts of iron, magnesium, alkali metals, alkaline earths and other such cations sandwiched between the layers, which cations can exchange with heavy metal cations in aqueous solution.

In "Saudi Arabian clays for lead removal in wastewater", *Applied Clay Science*, 42:671-674 (2009), by S. A. Al-Jlil and F. D. Alsewailem, incorporated by reference herein in its entirety, several naturally occurring Saudi Arabian clay materials were tested for lead adsorption efficiency from wastewater in batch processes. In some experiments, pretreatment of the clay with hydrochloric acid was found to increase lead adsorption efficiency, while other clays performed better in the absence of pretreatment. Additionally, adsorption efficiency was demonstrated to increase with increasing pH of the lead-contaminated water solution.

However, clays cannot be used in a continuous process due to their bulkiness and relatively low structural strength. As such, clay has typically been used in only batch processing, since packing an ion-exchange column with naturally occurring clay for continuous processing results in tightly-packed clay, especially when the process is conducted under pressure. Such tight packing ultimately reduces or completely blocks the process flow. Additionally, clay packings have a tendency to channel under high pressure, resulting in reduced contact between the heavy metal contaminant ions and the naturally occurring cations in the clay matrix, reducing overall efficiency in heavy metal removal from the process stream.

In an effort to address these deficiencies, the present inventors have discovered a new adsorbent composition for heavy metal ions which are dissolved in aqueous media, which packs in a column more uniformly and with better porosity than clay particles alone, and is much more tolerant of applied pressure.

In one embodiment, an adsorbent composition for metal ions is disclosed comprising a granulated mixture of from about 1 wt % to about 15 wt % clay, even between about 3 wt % and 10 wt %, or even between about 4 wt % and 7 wt %, such as about 5 wt % clay, and a thermoplastic polymer matrix, and preferably having less than about 1 wt % of additional adsorbents. Advantageously, the thermoplastic polymer is one having a melting or softening point above about 180° C., which permits melt-mixing of particles of clay with the polymer to form the claimed mixtures.

In a preferred embodiment, the thermoplastic polymer is polyethylene terephthalate (PET) or polystyrene (PS), both of which polymers have a suitable affinity for clay particles and are readily melt processed according to conventional techniques. The polymers can be so-called "virgin" polymers, i.e. newly formed polymers, or can be derived from polymer scrap, such as recycled polymer, which is a particularly advantageous embodiment of the invention, as it permits reuse of polymer materials which might otherwise be discarded, necessitating disposal in a landfill or the like.

The adsorbent clay is preferably one which has a naturally-occurring ion-exchange capacity, such as an Illite clay. Illite clay is a non-expanding, micaceous mineral, classified as a phyllosilicate or layered aluminosilicate, which has a repeating layered structure of tetrahedron-octahedron-tetrahedron molecules, wherein the interlayer spaces are occupied by poorly hydrated potassium cations. One particularly suitable such clay is found in the north region of Saudi Arabia. The present inventors have found that, likely because of the excellent dispersion of clay particles in the adsorbent composition, in combination with the excellent structural strength of the overall composition, it is unnecessary to incorporate additional known adsorbent materials, such as activated carbon, silica, or the like, to the presently disclosed adsorbent to achieve good heavy metal removal from industrial waste streams. As such, the presently disclosed adsorbent preferably incorporates less than about 1 wt % of such additional, conventional adsorbents, greatly reducing costs and complexity.

In order to enhance such excellent dispersion of clay particles within the polymer matrix, it can be advantageous to incorporate between about 0.2 wt % and about 0.6 wt % of an emulsifier, preferably an alkyl-trimethyl-ammonium surfactant, such as cetyl-trimethyl-ammonium bromide (CTAB), with the clay and polymer upon melt mixing. Those skilled in the art will recognize that many other such emulsifiers can be used, so long as they are stable at the melt processing temperatures used to melt mix the adsorbent clay particles and polymers.

One manner of making the new adsorbent composition is to mill clay to a size below about 100 mesh and wash the clay particles with distilled water several times to remove impurities. The clay is then dried in a vacuum oven overnight. The dried clay is composited with polymer particles, and optionally an emulsifier, dry blended and then fed to an extruder at a temperature above the melting or softening point of the particular polymer in use, such as above about 180° C., even above 190° C., or even above 250° C. The extrudate is collected in a water bath, dried and subsequently ground to granules of different sieve sizes, ranging for example from about 0.5 mm to about 3 mm. When an emulsifier is used, it can be incorporated at concentration levels of about 0.3 g/100 grams of the other components.

The granulated adsorbent composition can be packed into a separation column or other such suitable vessel, either in the dry state or by mixing with water and allowing the packing to settle into a packed bed toward the bottom of the vessel. As illustrated in FIG. 1, heavy metal contaminated water which is stored in a vat 101 is withdrawn through pump 102 and fed under pressure to column 103 containing the adsorbent composition particles. The amount of pressure can be varied based upon the length and width of the column, the adsorbent composition particle size and the overall requirements of the removal process. The applied pressure should not be so high as to cause the adsorbent composition packing to collapse or to form channels within the packing. Treated water is withdrawn at output valve 104, while some treated water is recycled through recycle line 105 back into vat 101. Recycling treated water increases the contact time of lead ions with clay particles. In most cases it was found that samples withdrawn after half-an hour achieved good percentage of lead removal.

Thus, in another embodiment the invention is directed to a method for removing heavy metals from contaminated water, comprising passing a stream of water having a concentration of one or more heavy metals through an adsorbent composition as disclosed above, comprising granules of a mixture of from about 1 wt % to about 15 wt %, even between about 3 wt % and about 10 wt % clay, or even between about 4 wt % and 7 wt %, such as about 5 wt % clay and a thermoplastic polymer matrix, preferably having less than about 1 wt % of additional adsorbents; and collecting water having a reduced concentration of said heavy metal(s) downstream of said adsorbent composition.

The thermoplastic polymer can be any thermoplastic polymer which can be melt processed, such as by a melt extruder, and is advantageously polyethylene terephthalate (PET) or polystyrene (PS), which have been demonstrated to have a good affinity for dispersion of clay particles.

The removal method can be enhanced by passing said stream of heavy-metal contaminated water through said adsorbent composition packing under applied pressure, which can be adjusted based upon the length and width of the column, the adsorbent composition particle size and the overall requirements of the removal process. The applied pressure should not be so high as to cause the adsorbent composition packing to collapse or to form channels within the packing. In a preferred mode, the solution being treated is maintained at a pH>3, is treated for at least about 30 minutes at ambient temperature or above. Higher treatment temperatures will result in better adsorption.

The removal method preferably utilizes clay particles which have a naturally-occurring ion-exchange capacity, such as for example an Illite clay, and can be preferably practiced in a continuous mode, such that a continuous stream of said heavy-metal contaminated water is passed through said adsorbent composition packing under applied pressure.

The removal method is effective in removing heavy metals including lead, chromium, copper, zinc, cadmium and combinations thereof. We have found that when the heavy metal is lead the concentration of lead in said water is reduced by more than about 30%, even as much as about 56%.

Example 1

Illite clay in the form of soft rocks was received and milled to a particle size below 100 mesh, washed with distilled water several times and dried in a vacuum oven over night. The dried clay particles were then dry blended with PS particles and CTAB emulsifier at concentrations of about 5 wt % clay particles and about 0.3 wt % CTAB, relative to the weight of the entire composition. The mixture was then fed to a Lab Min Extruder (LME) manufactured by Dynisco Company at a temperature of about 190° C. and extruded into a water bath to solidify the extrudate. The extrudate was dried, cut into pellets and then ground into particles sized between about 0.5 mm to 3 mm. 2 to 4 grams of adsorbent particles so-formed were packed in the column as shown in FIG. 1, then 300-700 mL water contaminated with 100 ppm Pb was circulated through the adsorbent bed at ambient temperature. The samples were drawn every thirty minutes using the valve 104 in FIG. 1. The lead content of the water was tested by atomic absorption spectroscopy and determined to be less than 70 ppm, the removal efficiency being greater than 30% [~38%-55%].

Example 2

The dried clay particles of Example 1 were dry blended with PET particles and CTAB emulsifier at concentrations of about 5 wt % clay particles and about 0.3 wt % CTAB, relative to the weight of the entire composition. The mixture was then fed to a Lab Min Extruder (LME) manufactured by Dynisco Company at a temperature of about 285° C. and extruded into a water bath to solidify the extrudate. The extrudate was dried, cut into pellets and then ground into particles sized between about 0.5 min to 3 mm. 2-4 grams of adsorbent particles so-formed were combined with 300-700 mL water contaminated with 100 ppm Pb, and stirred in a batch process for about 30 minutes at a ambient temperature. After stirring was complete, the lead content of the water was tested and determined to be less than 80 ppm, the removal efficiency being greater than about 20%.

The foregoing examples have been provided for the purpose of explanation and should not be construed as limiting the present invention. While the present invention has been described with reference to an exemplary embodiment, changes may be made within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method for removing heavy metals from contaminated water, comprising:
   passing a stream of water having a concentration of one or more heavy metals through an adsorbent composition comprising granules of a mixture of clay particles having an ion exchange capacity for heavy metals dispersed within a thermoplastic polymer matrix; and
   collecting water having a reduced concentration of said heavy metal(s) downstream of said adsorbent composition.

2. The method of claim 1, wherein the adsorbent granules have less than about 1 wt % of additional adsorbents.

3. The method of claim 1, wherein the adsorbent composition is packed in a separation column or vessel.

4. The method of claim 1, further comprising passing said stream of heavy-metal contaminated water through said adsorbent composition under applied pressure.

5. The method of claim 1, wherein the process is conducted at a pH>3.

6. The method of claim 1, wherein said adsorbent composition is a mixture of between about 3 wt % and about 10 wt % clay in a thermoplastic polymer matrix.

7. The method of claim 1, wherein the clay has a naturally-occurring ion-exchange capacity.

8. The method of claim 7, wherein the clay is an Illite clay.

9. The method of claim 1, wherein a continuous stream of said heavy-metal contaminated water is passed through said adsorbent composition under applied pressure.

10. The method of claim 1, further comprising recycling at least a portion of the stream of water to again pass through the adsorbent composition.

11. The method of claim 1, wherein the adsorbent composition comprises from about 1 wt % to about 15 wt % clay particles.

12. The method of claim 1 wherein the adsorbent composition comprises between about 0.2 wt % and about 0.6 wt % of an emulsifier.

13. The method of claim 12, wherein the emulsifier is an alkyl-trimethyl-ammonium surfactant.

14. The method of claim 12, wherein the emulsifier is cetyl-trimethyl-ammonium bromide.

15. The method of claim 14, wherein the cetyl-trimethyl-ammonium bromide is present at a concentration of about 0.3 wt %.

* * * * *